United States Patent Office 3,410,663
Patented Nov. 12, 1968

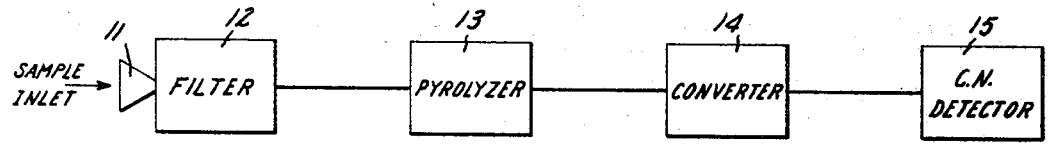

3,410,663
THERMOPARTICULATE DETECTION OF EXPLOSIVES
Hugh T. Reilly, Elkton, Md., and Frank W. Van Luik, Jr., Schenectady, N.Y.; said Van Luik assignor to General Electric Company, a corporation of New York
Filed Mar. 29, 1965, Ser. No. 443,527
2 Claims. (Cl. 23—230)

ABSTRACT OF THE DISCLOSURE

High explosives such as dynamite or nitroglycerine are significantly volatile at room temperatures and so produce vapor comprising organic nitrate compounds. These air borne vapors may be pyrolyzed to form nitrogen dioxide which is then reacted in the presence of oxygen, ammonia and water to form ammonium nitrate particles which may be detected and measured in a condensation nuclei detector.

---

This invention relates to a new and improved method for detecting explosives.

More particularly, the invention relates to a new and improved themoparticulate method of detecting the presence of explosives such as dynamite and nitroglycerine by characteristic vapor emitted by these explosives.

In a copending application by C. B. Murphy, entitled "Thermo-Particulate Detection of Nitrogenous Materials," filed concurrently herewith, Ser. No. 443,377, a method for the thermoparticulate detection of nitrogenous materials is disclosed. Briefly, the method disclosed in the Murphy application comprises first converting the nitrogenous materials to a substance which can act as a condensation nuclei, and subsequently detecting the condensation nuclei thus formed in a condensation nuclei detector. The codensation nuclei detector is an instrument which is commercially available from the General Electric Company, and serves to condense water around the condensation nuclei as centers, then measures the light scattering effect of the water droplets thus formed with appropriate optical-electrical circuitry. For a more detailed description of the condensation nuclei detector as well as the use of such detectors in the thermoparticulate analysis of gases, reference is made to an article entitled, "Condensation Nuclei, a New Technique for Gas Analysis," by F. W. Van Luik and R. E. Rippere appearing in Analytical Chemistry, vol. 32, p. 1617, November 1962, and to an article entitled, "TPA—A New Method for Thermal Analysis of Polymeric Materials," by C. B. Murphy, F. W. Van Luik, and A. C. Pitsas, appearing in Plastics Design and Processing Magazine, July 1964 issue.

The present invention relates to the application of this new thermoparticulate method of gas analysis to the detection of explosives.

More particularly, the invention relates to a new and improved thermoparticulate method of detecting the presence of explosives such as dynamite and nitroglycerine, by the thermoparticulate detection of characteristic vapors emitted by these explosives.

In practicing the invention, a method of detecting explosives is provided which comprises pyrolytically converting the vapor emitted from the explosive in an oxygen atmosphere to form nitrogen dioxide, chemically reacting the nitrogen dioxide with water and ammonia to form salt particles that act as condensation nuclei, and detecting the condensation nuclei thus produced with the condensation nuclei detector.

Other objects, features, and many of the attendant advantages of this invention will be appreciated more readily as the same becomes better understood by reference to the following detailed description, when considered in connection with the accompanying drawing, wherein the single drawing depicts a suitable apparatus employed in carrying out the novel method of explosive detection made possible by the present invention.

As shown in the drawing, the apparatus with which the present method is practiced comprised by an air scoop or other suitable sample inlet device 11 connected to the input of a filter 12. Filter 12 may be a standard Gelman type filter, and serves to remove any ambient particles entrained in a gaseous sample introduced into the filter through inlet 11. The output of filter 12 is connected to the input of a pyrolyzer 13 which may be of a conventional type. Preferably, however, the pyrolyzer comprises a quartz glass tube which may be on the order of 12 inches long and having ⅜ inch inside diameter. The central portion of this tube is wrapped with electric heating tape of a conventional type, and then covered with an asbestos insulation tape so as to minimize heat loss from the electric heating tape and to maximize the amount of heat developed with the interior of the pyrolyzer tube. With a pyrolyzer constructed in this manner, it is anticipated that the pyrolyzer would be capable of operation over a temperature range of about 50° C. to 120° C. by the application of appropriate heating current to the heating wires surrounding the pyrolyzer.

After pyrolytic conversion in the pyrolyzer 13, the gaseous sample is passed to a reaction converter vessel 14 of a conventional type. The converter 14 preferably contains an aqueous solution of ammonia and the sample gas is reacted with ammonia gas given off by the aqueous solution of ammonia and with water vapor to produce condensation nuclei particles. These condensation nuclei particles are then supplied to a conventional condensation nuclei detector 15 where they are counted and an indication given of the number of such particles thereby providing an indication of the presence of the explosive.

It is known that most common explosives, such as dynamite which contains nitroglycerine, have a vapor pressure such that at room temperatures molecules in the vapor phase are given off. This is also true of the explosive known as ethylene glycol dinitrate which along with glycerol trinitrate (nitroglycerine) constitutes an aliphatic nitrate ester of which there are several others. The sample gas containing the aliphatic nitrate ester after being filtered by filter 12 to remove any ambient airborne particles contained therein is introduced into the pyrolyzer 13. Pyrolyzer 13, which preferably is operated in the temperature range from 60° C. to 120° C., pyrolytically converts the aliphatic nitrate ester vapor to nitrogen dioxide in accordance with the following reaction expressions:

Ethylene glycol dinitrate

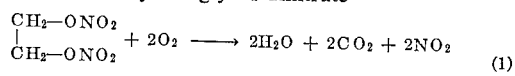

$$\begin{array}{l}CH_2\text{—}ONO_2 \\ | \\ CH_2\text{—}ONO_2\end{array} + 2O_2 \longrightarrow 2H_2O + 2CO_2 + 2NO_2 \qquad (1)$$

Glycerol trinitrate (nitroglycerine)

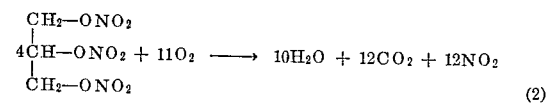

$$\begin{array}{l}CH_2\text{—}ONO_2 \\ | \\ 4CH\text{—}ONO_2 \\ | \\ CH_2\text{—}ONO_2\end{array} + 11O_2 \longrightarrow 10H_2O + 12CO_2 + 12NO_2 \qquad (2)$$

After the pyrolytic conversion of the aliphatic nitrate ester vapor to nitrogen dioxide in pyrolyzer 13, the nitrogen dioxide ($NO_2$) is then supplied to the reaction converter vessel 14. The reaction converter vessel 14 preferably contains an aqueous solution of ammonia which gives off ammonia gas and water vapor both of which react with the nitrogen dioxide to produce ammonium nitrate particles as set forth in the following reaction expression:

$$4NO_2 + O_2 + 2H_2O \rightarrow 4HNO_3 \quad (3)$$
$$HNO_3 + NH_3 \rightarrow NH_4NO_4 \quad (4)$$

It should be noted that although the reactions set forth in expressions (3) and (4) above are distinguishable, they readily occur when the pyrolyzer effluent is entrained over the aqueous solution of ammonia. Air contained in the sample gas provides the oxygen while the aqueous solution of ammonia provides both the water vapor and the ammonia gas necessary for the gas phase reaction. The ammonium nitrate salt particles produced as a result of this chemical reaction are then supplied to the condensation nuclei detector 15 where they serve as centers for water droplet growth, and are measured.

As an alternative arrangement to the use of aqueous ammonia in the reaction converter 14, it would be possible to employ an aqueous solution of ammonia carbonate to give off the required water vapor and ammonia gas for the necessary reactions set forth in the expressions (3) and (4) above. Alternatively, the converter can have ammonia gas supplied to it from a separate ammonia gas generator as well as water vapor and achieve the same end. In any event, the reactions set forth in the expressions (3) and (4) above are necessary to produce the desired ammonium nitrate particles that are subsequently detected by the condensation nuclei detector.

In one specific example of practicing the invention, a flow rate through the apparatus was established of about 100 cubic centimeters per sample gas per second. A ⅜ inch thick by one and one-quarter inch diameter semicircular shaped piece of 60% dynamite was sniffed with the sample inlet varying in distance from the sample dynamite by about ⅛ inch to 5 inches. With this much variation in the distance from the sample piece of dynamite to the sample inlet, the signal noise ratio of the condensation nuclei detector varied between 1,000 and 1, respectively. If the sample piece of dynamite was then placed in a cardboard box and left for a period of time, the same variation in the distance of the sample inlet from the cardboard box provided a signal-to-noise variation of from 6 to 125, respectively. As a consequence of these figures, it can be appreciated that the invention makes available an extremely sensitive means for detecting the presence of explosives whether the explosives are exposed to the atmosphere, or contained within some form of wrapping. The construction and operation of the condensation nuclei detector 15 is described more fully in U.S. Patent Nos. 2,684,008 and 3,037,421 as well as in the above-referenced articles by Van Luik et al. and Murphy et al. Briefly, however, the gaseous sample containing particles to be detected and measured is drawn through the instrument by a vacuum pump comprising a part of the c.n. detector. The gaseous sample first is introduced into a humidifier also comprising a part of the detector where its relative humidity is raised to about 100 percent with water. The humidified sample then passes through a rotating valve into a cloud chamber where it is expanded adiabatically by the valving and transport system. This causes the sample to cool and the relative humidity to rise to any desired supersaturation up to about 400%. As a consequence, condensation takes place on the particles as condensation centers so that a cloud of water droplets is formed with each droplet containing an airborne nucleus. The cloud of water droplets is then measured by dark field optical system including a photomultiplier which measures the scattering effect on light of the water droplets. The amount of light scattering is proportional to the number of droplets in the sample, and this in turn is proportional to the number of particles contained in the gaseous sample introduced into the detector. After measurement by the optical system, the sample is then flushed out of the detector through the rotating valve system, and discharged in the exhaust of the vacuum pump. A complete measurement cycle may be varied from three to ten times per second although normal operation is about five cycles per second. The complete sequence of events for any given sample from intake and humidification to expansion, measurement, and discharge plus the time needed for the instruments to respond can be in the order of 1.5 seconds. The output indication contained from the detector is in the form of an electrical signal produced from the multiplier phototube employed in the dark field optical system. The condensation nuclei detector can detect concentrations as small as 10 or as large as $10^7$ particles per cubic centimeter of gaseous samples. Sample flow can be varied from 20 to several hundred cubic centimeters of gas per second by adjusting a critical orifice in the rotating valving system. The detector is extremely sensitive in that it can detect about $10^4$ molecules of material in $10^{19}$ molecules of air or about one part in $10^{15}$.

Condensation nuclei particles may be liquid or solid submicroscopic airborne particles, each of which can act as the nucleus for the formation of a water droplet. Their size may vary from 0.001 to 0.1 micron in diameter. Such nuclei are found in nature, or may be created artificially as in the present process, and may range in concentration from a few hundred to hundreds of thousands per cubic centimeter of the gaseous volume in which they are entrained. The nucleus derives its name from its triggering role in causing supersaturated water vapor to condense into water droplets. Water vapor in air that contains no particles will not start to condense into droplets until the air is 800% supersaturated. The time required for the growth process from nucleation at about 0.001 micron in diameter to a visible droplet having a size of about 1 micron diameter is in the order of 7 milliseconds. This speed of growth is an important factor in the detector, and the growth in size of the particle provides an amplification factor which can be utilized to give extreme sensitivity to this method of measurement.

One of the important conditions affecting sensitivity of this method of thermoparticulate analysis is the dwell time between the creation of the condensation nuclei and the measurement of their concentration in the condensation nuclei detector. The conversion process made possible by this invention involving the pyrolytic conversion of the aliphatic nitrate ester in an oxygen atmosphere followed by a reaction conversion of the nitrogen dioxide with water vapor and ammonia gas, relieves the need of any critical vacuum setting for the condensation nuclei detector. This is due to the fact that the reaction process provides the additional necessary dwell time, which can be readily controlled by controlling the flow rates through the system, required to allow the nuclei to grow in size so that it can be readily detected by the condensation nuclei detector without requiring critical vacuum settings. In addition, the method possesses improved sensitivity so that it is capable of detecting extremely small trace quantities of aliphatic nitrate ester gases.

As stated above, the sensitivity of the condensation nuclei detector is sufficient to measure from 10 to $10^7$ particles per cubic centimeter. These measurements are made over linear full scale ranges of 300, 1,000, 3,000, 10,000, 30,000, and 100,00 nuclei per cubic centimeter. In addition to these, two non-linear ranges having full scale values of $10^6$ and $10^7$ nuclei per cubic centimeter are also provided by the detector. If it is assumed that nuclei having a radius of 0.01 micron are measured at a concentration of, for example, 100 per cubic centimeter, and it is further assumed that the density of the particles is 1, then the mass of the particles being detected is $4 \times 10^{-16}$ grams per cubic centimeter. The extreme small size of this number indicates the value of this method in detecting very small trace amounts of aliphatic nitrate ester vapors.

From the foregoing description, it can be appreciated that the invention provides a new and improved thermoparticulate method of detecting the presence of explosives such as dynamite and nitroglycerine by the thermoparticulate detection of characteristic vapors emitted by these explosives.

Having described an improved thermoparticulate method of detection of explosives in accordance with the invention, it is believed obvious that other modifications and variations of the invention are possible in the light of the above teachings. It is, therefore, to be understood that changes may be made in the particular embodiment of the invention described which is within the full intended scope of the invention as defined by the appended claims.

What we claim as new and desire to secure by Letters Patent of the United States are:

1. The method of detecting explosives comprising organic nitrates having significant volatility at room temperature which comprises pyrolitically converting the vapor emitted from such explosives in an oxygen atmosphere in the temperature range of from about 60° to 110° C. to form nitrogen dioxide, hydrolyzing the nitrogen dioxide in the presence of oxygen to form nitric acid, reacting the nitric acid with ammonia gas to form ammonium nitrate particles and detecting the particles with a condensation nuclei detector.

2. The method recited in claim 1 wherein the vapor is filtered prior to pyrolysis.

References Cited

UNITED STATES PATENTS

| 3,094,392 | 6/1963 | Skala | 23—232 |
| 3,117,841 | 1/1964 | Van Luik et al. | 23—232 |

MORRIS O. WOLK, *Primary Examiner.*

R. E. SERWIN, *Assistant Examiner.*

PO-1050
(5/69)

UNITED STATES PATENT OFFICE
CERTIFICATE OF CORRECTION

Patent No. 3,410,663     Dated November 12, 1968

Inventor(s) HUGH T. REILLY and FRANK W. VAN LUIK, Jr.

It is certified that error appears in the above-identified patent and that said Letters Patent are hereby corrected as shown below:

The assignment data in column 1 reads as follows:

Hugh T. Reilly, Elkton, Md., and Frank W. Van Luik, Jr., Schenectady, N. Y.; said Reilly assignor to the United States of America as represented by the Secretary of the Army and said Van Luik assignor to General Electric Company, a corporation of New York.

Signed and sealed this 8th day of June 1971.

(SEAL)
Attest:

EDWARD M. FLETCHER, JR.          WILLIAM E. SCHUYLER, JR.
Attesting Officer                Commissioner of Patents